(12) United States Patent
Naepflin et al.

(10) Patent No.: US 9,958,638 B2
(45) Date of Patent: May 1, 2018

(54) OPTIMAL KINEMATIC MOUNT FOR LARGE MIRRORS

(71) Applicant: Raytheon Company, Waltham, MA (US)

(72) Inventors: Hans P. Naepflin, Waltham, MA (US); Alexander K. Raco, Waltham, MA (US); Maciej D. Makowski, Waltham, MA (US)

(73) Assignee: Raytheon Company, Waltham, MA (US)

( * ) Notice: Subject to any disclaimer, the term of this patent is extended or adjusted under 35 U.S.C. 154(b) by 108 days.

(21) Appl. No.: 14/026,314

(22) Filed: Sep. 13, 2013

(65) Prior Publication Data
US 2015/0077874 A1    Mar. 19, 2015

(51) Int. Cl.
*G02B 7/182*    (2006.01)
*G02B 7/183*    (2006.01)

(52) U.S. Cl.
CPC .......... *G02B 7/1822* (2013.01); *G02B 7/183* (2013.01); *Y10T 29/49826* (2015.01)

(58) Field of Classification Search
CPC .... G02B 26/0858; G02B 26/06; G02B 7/183; G02B 7/1822; G02B 7/182
USPC ....................................... 359/872, 848, 849
See application file for complete search history.

(56) References Cited

U.S. PATENT DOCUMENTS

| 5,461,515 | A | * | 10/1995 | Sorce | F16M 11/125 |
| | | | | | 248/481 |
| 5,949,593 | A | | 9/1999 | Lloyd | |
| 6,007,894 | A | * | 12/1999 | Barnes | B29C 70/30 |
| | | | | | 156/169 |
| 6,046,399 | A | * | 4/2000 | Kapner | F24J 2/045 |
| | | | | | 136/244 |
| 6,402,329 | B1 | * | 6/2002 | Bailly | G02B 7/1822 |
| | | | | | 248/476 |

(Continued)

FOREIGN PATENT DOCUMENTS

| JP | H07-072318 | 3/1995 |
| JP | 2002-501222 | 1/2002 |

(Continued)

OTHER PUBLICATIONS

Castel et al; The 3.2m all SiC Telescope for SPICA; Modern Technologies in Space- and Ground-based Telescopes and Instrumentation II, Proceedings of SPIE; Sep. 13, 2012; 13 pages; vol. 8450; SPIE—International Society for Optical Engineers.

(Continued)

*Primary Examiner* — Stephone B Allen
*Assistant Examiner* — Rahman Abdur

(57) ABSTRACT

A high performance kinematic mirror mount facilitating the reduction of thermally and mechanically induced optical distortion of a precision mirror is disclosed. The mirror mount assembly includes a mirror with a front reflective surface and a rear support surface. A set of sub-tier mounting assemblies are provided being affixed to the rear support surface of the mirror utilizing a number of strut pairs and a number of bonded mount pads arranged so as to connect the sub-tier mounting assemblies to the mirror with numerous strut pairs arranged as bipods.

25 Claims, 10 Drawing Sheets

(56) References Cited

U.S. PATENT DOCUMENTS

| | | | |
|---|---|---|---|
| 7,195,361 B2 * | 3/2007 | Ealey | G02B 26/06 250/201.9 |
| 7,589,686 B2 | 9/2009 | Balzovsky et al. | |
| 2010/0202071 A1 * | 8/2010 | Preumont | G02B 26/06 359/849 |

FOREIGN PATENT DOCUMENTS

| | | |
|---|---|---|
| JP | 2010-049257 | 3/2010 |
| JP | 2012-162449 | 8/2012 |
| JP | 2014-010332 | 1/2014 |

OTHER PUBLICATIONS

Cayrel; E-ELT Optomechanics: Overview; Ground-based and Airborne Telescopes IV, Proceedings of SPIE; Sep. 17, 2012; 18 pages; vol. 8444; SPIE—International Society for Optical Engineers.

Robichaud et al.; Silicon carbide optics for space and ground based astronomical telescopes; Modern Technologies in Space- and Ground-based Telescopes and Instrumentation II, Proceedings of SPIE; Sep. 13, 2012; 8 pages; vol. 8450; SPIE—International Society for Optical Engineers.

PCT Application PCT/US2014/046540; filed Jul. 14, 2014; Raytheon Company; mailing date Oct. 9, 2014.

* cited by examiner

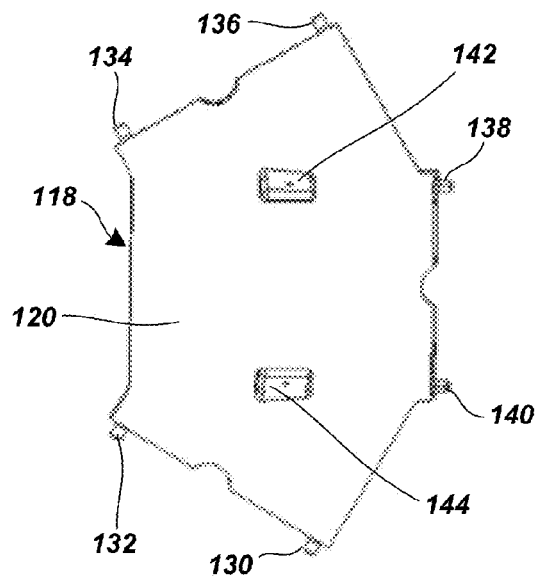
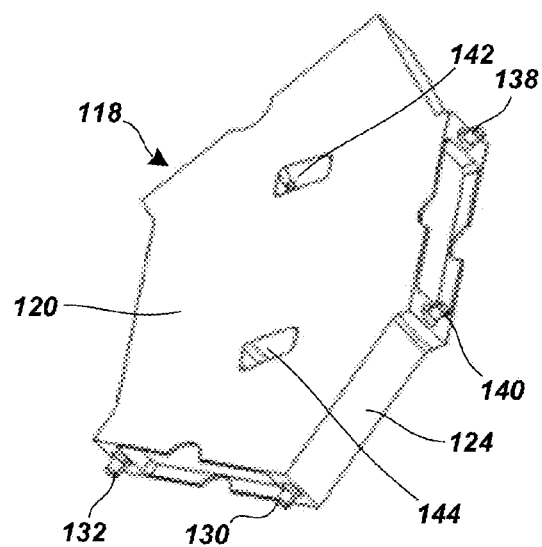
*FIG. 6a*  *FIG. 6b*
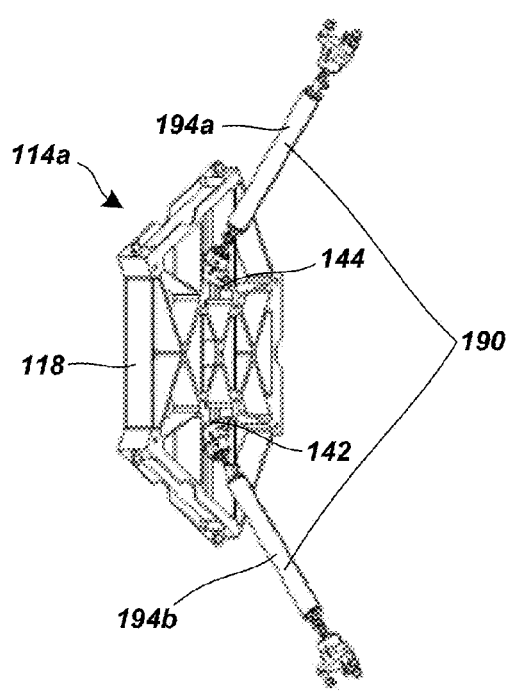
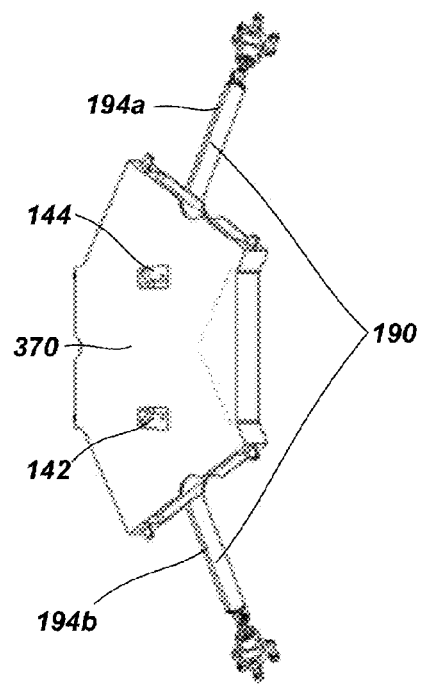
*FIG. 7a*  *FIG. 7b*

OPTIMAL KINEMATIC MOUNT FOR LARGE MIRRORS

BACKGROUND

Telescopes often use large curved mirrors. These mirrors can be made from various reflective materials including glass, silicon carbide, polished metals, or any number of materials. Applications of telescopes range from common looking glasses, large observatory telescopes, to large telescopes on a satellite. Telescopes located on the surface of the earth have a major drawback of being forced to look through the atmosphere, which can cause a certain amount of light distortion that can result in blurred or distorted images and which can limit the range of the focal points. Imaging from telescopes in located above the atmosphere in space have much better ranges and abilities to focus on smaller areas and capture clearer images of distant objects. In order to launch a telescope to space it is highly desirable to reduce the weight of the telescope, and therefore the mirrors inside, in order to reduce associated costs and mission difficulties. Additionally, due to the sensitive nature of a telescope, it is greatly desirable to maintain an extremely strong support system.

Another problem arises as a result of the construction of the telescopes, and particularly with the curved mirrors often utilized. In one example, the mirrors used often have fairly large surface areas to facilitate enhanced performance. However, building a mirror with a large reflective surface having consistent and near flawless mirror curvatures and surfaces can be difficult. Nonetheless, the more flawless the curvature and the more flawless the reflective surface the greater the clarity of the image and the greater the range of the telescope.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 6A is a top view of the support base of the sub-tier mounting assembly of FIG. 3;

FIG. 6B is an isometric view of the support base of the sub-tier mounting assembly of FIG. 3;

FIGS. 7A and 7B are isometric views of the support base of FIG. 2 illustrating the adjustable struts.

Figure 1A:
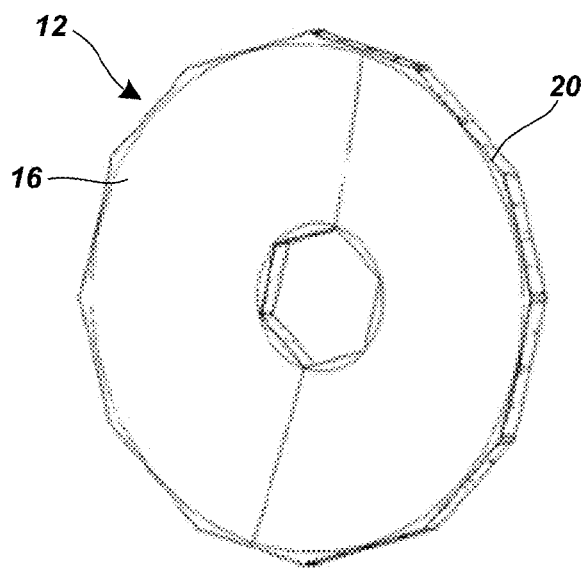
FIG. 1A is an isometric front view of an exemplary mirror, showing a reflective surface.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Adjustable supports for mirrors, particularly for use in telescopes, are widely available. Particularly, adjustable mounts allow for focusing of the telescope on different points. Focusing is necessary for clarifying images viewed from great distances, thus providing the ability to study objects without direct proximity. The ability to focus on more distant points and at greater clarity requires the use of mirrors having extremely tight tolerances, particularly in the dish curvature and the purity of the reflective surface. Mirrors having more precise dish curvature allow the mirrors to be focused on smaller and more distant points, and to provide images of these points with greater clarity. Unfortunately, even small amounts of distortion in a mirror surface can cause distortion in the produced images.

Distortion of the mirror surface can be caused by numerous factors, some of which may be a result of internal and/or external environmental factors. An example of an environmental distortion factor might be the presence of an intermediate substance, such as the earth's atmosphere. Indeed, the atmosphere can cause even the largest and most perfect mirror surfaces to produce clouded or imperfect images.

This realization has resulted in many telescopes being operated in space to minimize or eliminate the distortion caused by the atmosphere.

However, space is not void of other environmental considerations that may cause distortion. For example, temperatures in space can vary significantly from extremely cold, to extremely hot, where the thermal expansion of the materials of the mirror may cause a certain degree of distortion. Attempts to solve these problems have led to the formation of mirrors having a unitary construction with their support structures to reduce the amount of distortion as a result of the mismatch of thermal expansion coefficients between diverse materials.

Another cause of mirror surface distortion may be the stresses and strains applied to the mirror by a mounting structure in support of the mirror, such as an adjustable mounting structure. These adjustable mounting structures are often formed, by necessity, of materials differing from the material of the mirror surface, and as a result may have thermal print through distortion at the connection points between the structure and the mirror which may cause unwanted mirror surface distortion. Furthermore, the points where the adjustable mounting structures attach to the mirror may also experience forces, stresses, strains, shearing forces, and/or moments resulting from the forces required to focus or re-focus the mirror. The forces applied at these points can be applied to the mirrors support structure and may cause a certain degree of mirror surface distortion.

In particular, a major problem encountered in the design of telescopic mirrors, particularly those launched into outer space, is that different materials have different coefficients of thermal expansion. Therefore any structure affixed to the support structure of the mirror made of a material differing from that of the mirror may result in undesirable degrees of strain on the mirror caused by the two materials expanding or contracting at different rates, resulting in undesirable thermal print-through distortion to the reflective surface of the mirror.

As discussed briefly above, a further consideration for launching a telescope containing mirrors into space is keeping weight to a minimum while having a strong support system to support the delicate components of the telescope during the loads and strains encountered during the rapid accelerations present in the launch process.

Therefore, when designing a mirror assembly and an associated optimal kinematic mirror mount, it is desired to provide a proper balance between low thermal distortion performance and strength performance. In order to achieve low thermal distortion, soft flexures may be used which do not transfer these loads into the mirror. However, this is in direct contradiction to the strength performance which stiff struts provide.

In light of the foregoing, embodiments of the present invention provide a lightweight kinematic or adjustable mirror mount that minimizes mirror surface distortion by minimizing the thermal print through at the connection points caused from extreme temperature gradients (such as those experienced in space) without sacrificing structural integrity. A proper balance between soft flexures which provide low thermal distortion while maintaining adequate strength performance can be achieved by arranging soft flexures as discussed below into bipod strut pairs arranged in a multiplicity of systems which provide stiffness in all directions while still not transferring thermally induced stresses and distortion to the mirror.

In some embodiments, the kinematic mirror mount of the present invention can facilitate a thermal distortion wave front error of the mirror between 2.5 and 5.7 microns root mean squared, or 0.004 and 0.009 waves root mean squared at a wavelength of 0.6328 microns, over a bulk temperature change of −30° C.

Figure 1B:
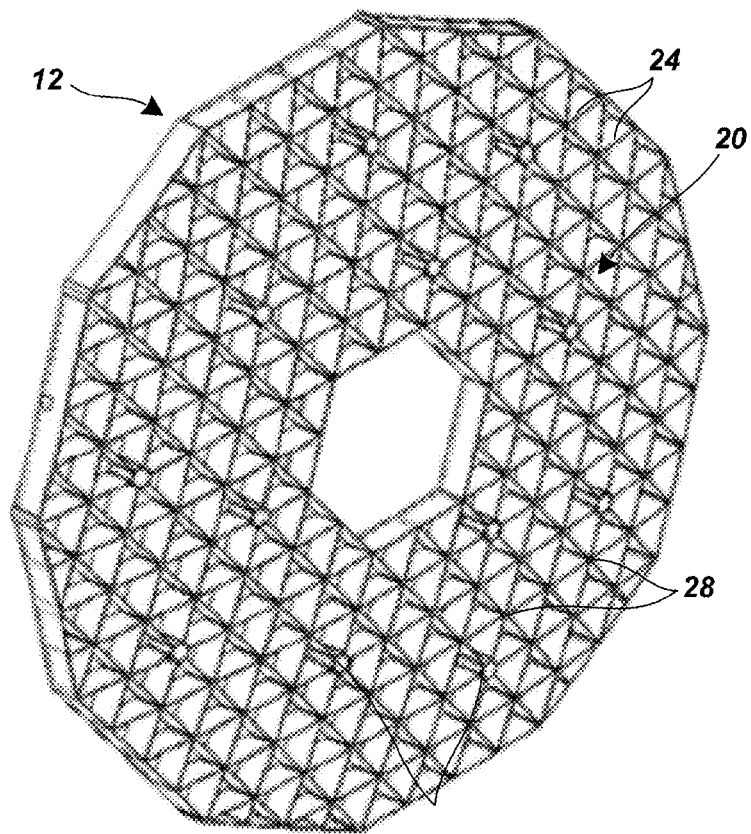
FIG. 1B is an isometric rear view of the mirror of FIG. 1, showing a support structure in support of the reflective surface.

Referring now to FIGS. 1A and 1B, illustrated is an exemplary mirror 12 having a reflective surface 16 and a support structure 20 in support of the reflective surface 16. The mirror 12 can be made of glass, polished metal, silicon carbide, or any other highly reflective material. The mirror 12 can be machined, cast, polished or fabricated in any suitable manner. For purposes of illustration, mirrors formed of silicon carbide will be discussed in more detail herein. However, mirrors of this type are not intended to be limiting in any way. Indeed, those skilled in the art will recognize that the kinematic mirror mount of the present invention can be configured to be operable with other mirror types having a suitable reflective surface.

A silicon carbide mirror, in particular, is usually cast in its final shape having a reflective surface unitarily formed with the support structure. In the embodiment shown, the mirror 12 comprises a silicon carbide makeup.

The support structure 20 of the mirror 12, configured to be in support of the reflective surface 16, can further be configured to maintain the curvature of the mirror 12 and allow for attachment of a mounting and/or an adjustment structure, as will be described below. The support structure 20 may comprise any number of different configurations. For example, the support structure 20 may be solid, or it may comprise a lattice-type configuration, as illustrated, such as for the purpose of reducing the overall weight of the mirror. More specifically, the exemplary support structure 20 shown, can comprise a series of support ribs 24 forming a latticework, which support ribs 24 may have uniform or varying thicknesses and may intersect one another to define a plurality of nodes 28. At least some of the nodes 28 may comprise additional structural elements, or be configured differently, as will be discussed below.

Figure 2:
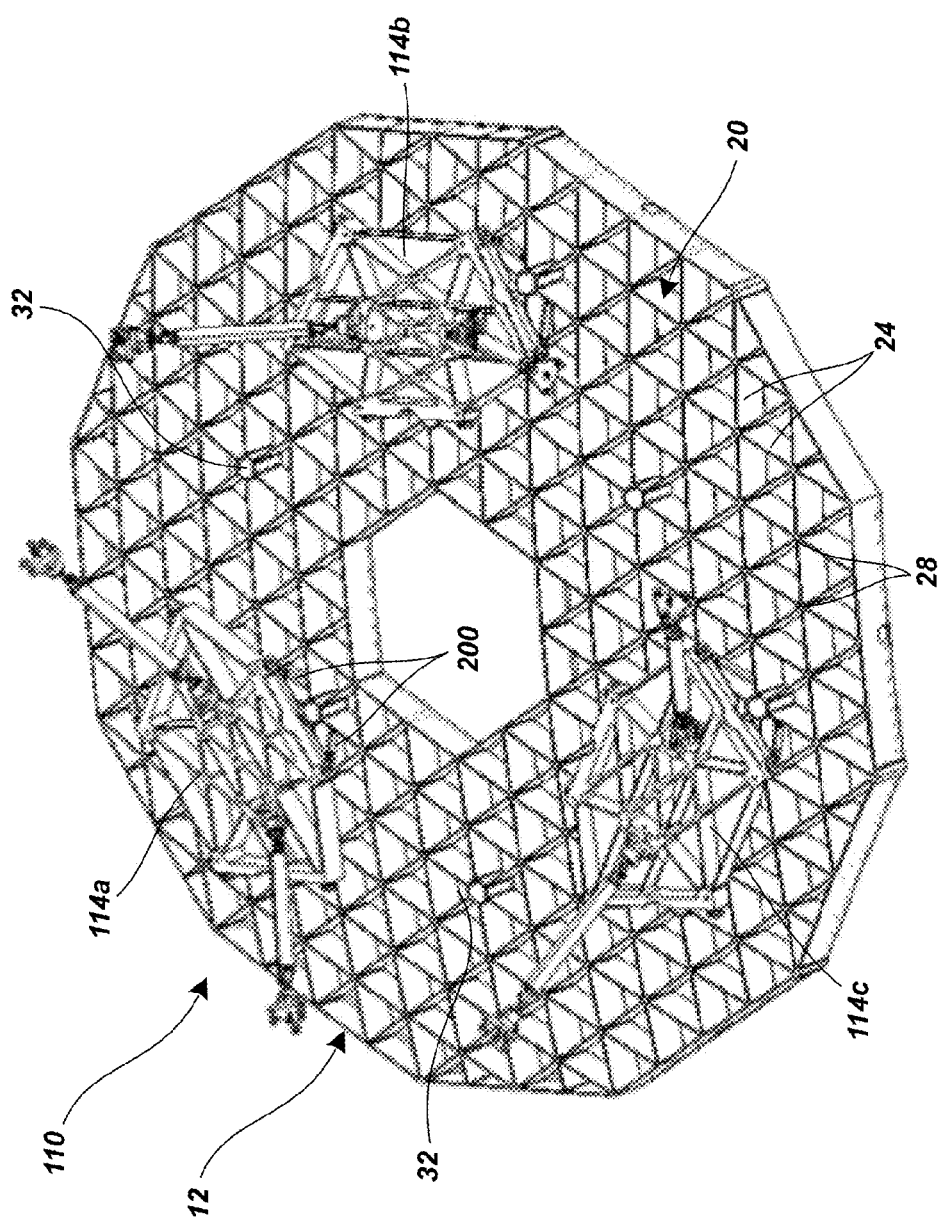
FIG. 2 is an isometric rear view of mirror assembly in accordance with one exemplary embodiment of the present invention, wherein the mirror assembly comprises a kinematic mirror mount having a plurality of sub-tier mounting assemblies in support of a mirror.
Figure 3:
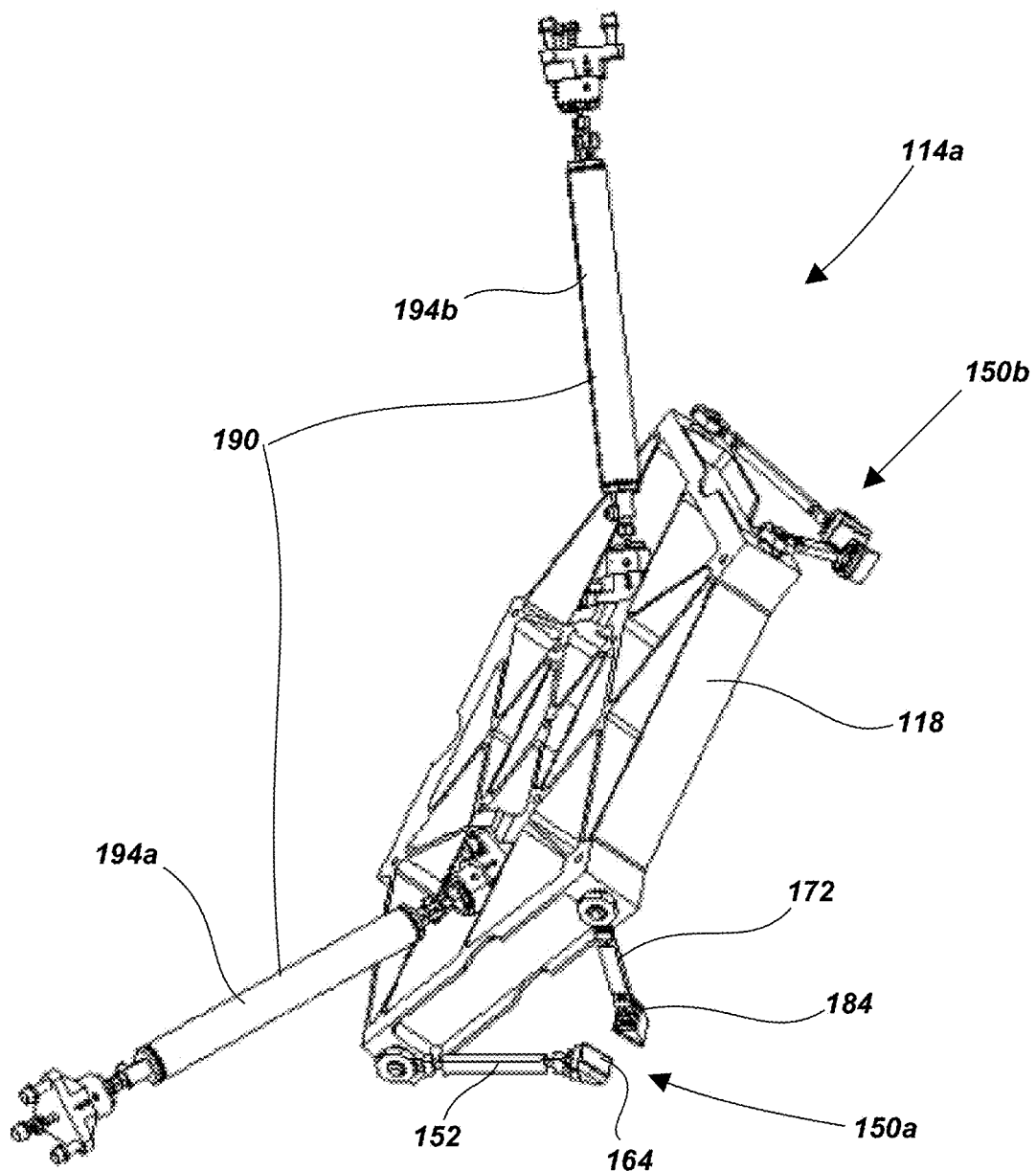
FIG. 3 illustrates a perspective view of one of the sub-tier mounting assemblies of the kinematic mirror mount and the mirror assembly of FIG. 2 in accordance with one exemplary embodiment.
Figure 4A:
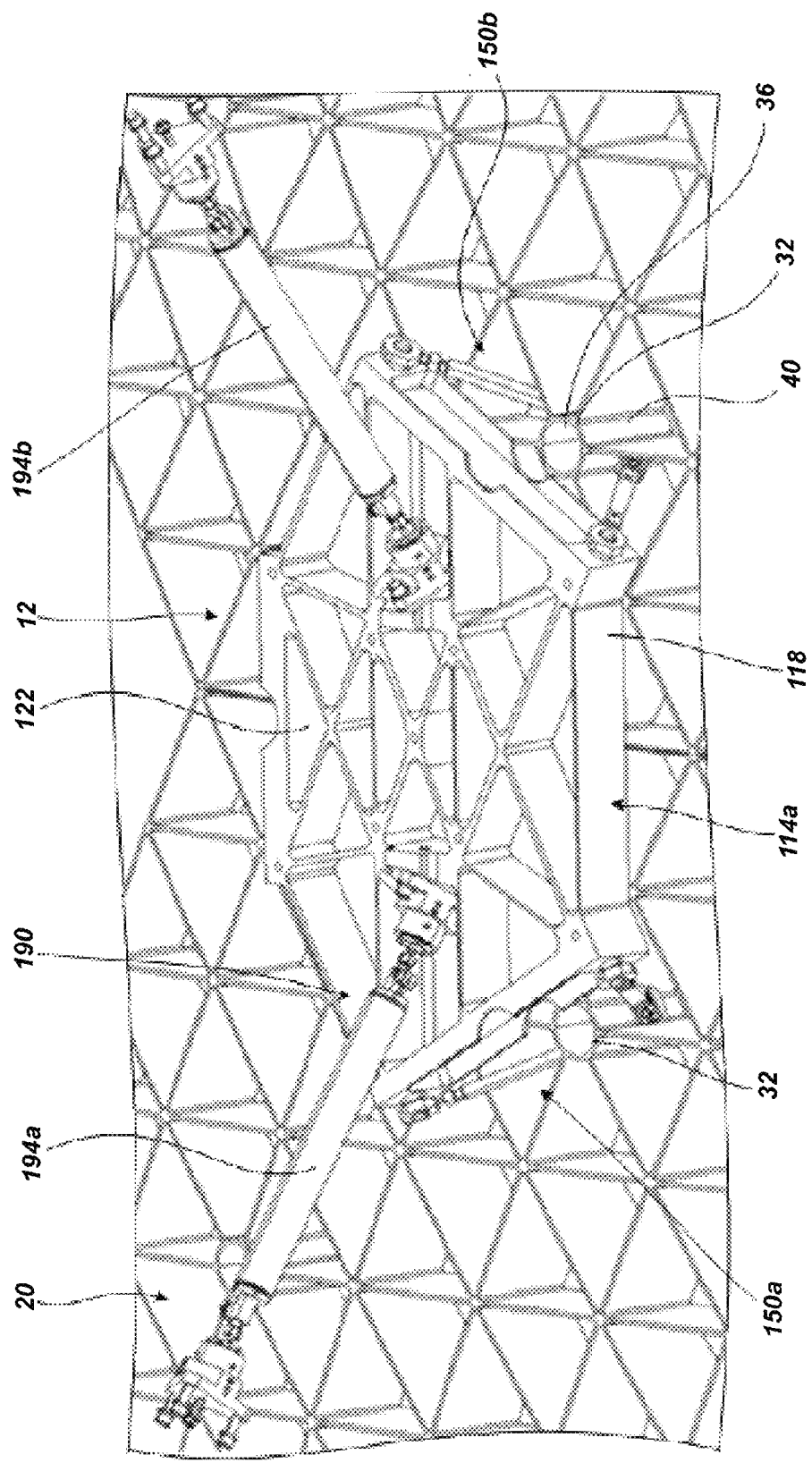
FIG. 4A is a detailed partial isometric rear view of the mirror assembly of FIG. 2, illustrating the sub-tier mounting assembly of FIG. 3, as coupled to the mirror.

With reference to FIGS. 1B, 2 and 4A, the support structure 20 of mirror 12, as discussed above, can comprise a plurality of support ribs 24 intersecting to form a plurality of nodes 28. At least some of these nodes may comprise additional structural elements, or in other words, may comprise nodes of a different configuration. For example, mirror 12 can further comprise nodes 32 having a hollow geometric configuration to provide additional rigidity to the support structure 20. Nodes 32 can comprise a thin-wall structural configuration defining an inner surface 36, an outer surface 40, and an interior volume. As discussed in more detail below, the inner surface 36 and outer surface 40 of the nodes 32 may act as connection surfaces to which other structures (e.g., mounting structures or assemblies) may be attached as these surfaces provide points of attachment in multiple directions. Portions of the support ribs 24 may also be utilized as attachment points for structures to be attached or coupled to the mirror 12. Indeed, the support ribs 24, the nodes 28/32 and/or any part of the support structure 20 may be utilized as a mounting surface. Furthermore, the support ribs 24 and/or the nodes 28/32 may comprise reinforced portions as needed, such as increased wall thicknesses, expansion struts, etc.

With reference to FIG. 2, illustrated is an exemplary mirror assembly 110 (e.g., an adjustable mirror assembly) comprising a mirror (e.g., the mirror 12 of FIGS. 1A and 1B). The mirror assembly 110 can further comprise a kinematic mirror mount comprising plurality of sub-tier mounting assemblies (see sub-tier mounting assemblies 114a, 114b, and 114c) acting as a single kinematic mounting system, configured in accordance with one exemplary embodiment of the present invention, wherein the sub-tier mounting assemblies 114 a-c are attached or otherwise secured or coupled to the support structure 20 of the mirror 12. Stated differently, the mirror 12 can be coupled or mounted to the plurality of sub-tier mounting assemblies 114 a-c. Indeed, the kinematic mirror mount can function to maintain the integrity of the mirror 12 by minimizing mirror surface distortion as compared to prior related mounting devices or systems, as explained herein.

As shown, the mirror assembly 110 and the kinematic mirror mount can comprise multiple sub-tier mounting assemblies (see sub-tier mounting assemblies 114a-c) spaced an equidistance from one another about the support structure 20 of the mirror 12 to distribute evenly the support forces about the mirror 12. Of course, this is not intended to be limiting in any way. Indeed, the present invention contemplates the use of any number of sub-tier mounting assemblies to provide the needed management of mirror surface distortion depending upon the intended use and the configuration of the overall system. Moreover, the collection of sub-tier mounting assemblies 114a-c can be spaced as needed, which spacing may or may not be equal.

Generally speaking, sub-tier mounting assemblies 114a-c facilitate supporting the weight and maintaining a position of the mirror 12 when integrating and aligning the mirror 12 at a system level. In addition, having multiple sub-tier mounting assemblies helps distribute any load exerted on the mirror 12 evenly across the entire mirror support structure 20 thereby minimizing any distortion which may be caused by supporting the mirror via alternative support methods. In order to reposition the mirror into a different configuration, as would be necessary for re-focusing, some force must be applied to obtain the new position. If forces translated through the kinematic mirror mount and the various sub-tier mounting assemblies are high enough, these may strain the mirror itself, which strain may result in distortion of the mirror surface, and thereby result in unacceptable image distortion. The distortion caused by mechanical loading of the support structure and repositioning of the mirror causes strain which may be referred to as mechanical print-through to the mirror surface.

Furthermore, it is anticipated that the sub-tier mounting assemblies 114a-c may perform better upon being properly aligned relative to the mirror 12. Proper alignment of each sub-tier mounting assembly can function to eliminate or cancel out lateral bending forces exerted on the support structure 20 of the mirror 12. Proper alignment considerations can include height, angle, and radial alignment of the various sub-tier mounting assemblies and their respective component parts.

For purposes of illustration, sub-tier mounting assembly 114a will be discussed in detail below. Although not described specifically or in further detail herein, sub-tier mounting assemblies 114b and 114c can be configured the same or similarly as sub-tier mounting assembly 114a, and can provide the same or similar functionality as sub-tier mounting assembly 114a, as will be recognized by those skilled in the art.

With reference to FIGS. 2-6B, illustrated is one of the sub-tier mounting assemblies, namely sub-tier mounting assembly 114a, shown as being secured to the support structure 20 of the mirror 12. The sub-tier mounting assembly 114a can comprise an support base 118, a plurality of bipod strut pairs 150a, 150b (the third bipod strut pair being hidden from view) supported about and extending from one side of the support base 118, and an adjustable strut pair 190 supported about and extending from an opposite side of the support base 118. The support base 118 can comprise a configuration that permits coupling of the bipod strut pairs to the support structure 20 of the mirror 12 without interfering with the ribs 24 of the support structure.

The support base 118, as briefly discussed above, can be adjustable within the support frame of the telescope (not shown) via adjustment of strut pair 190. By transferring the forces applied to the strut pair 190 through support base 118, it facilitates equal distribution of forces applied through it about the mirror during thermal expansion or contraction as well as when being repositioned, i.e. refocusing the mirror 12. More specifically, the support base 118 can be configured to distribute the forces applied to it evenly across each bipod strut pair associated therewith. The support base 118 can comprise an upper surface 120, a lower surface 122, and sides or sidewalls 124 extending between the upper and lower surfaces. In one exemplary embodiment, the support base 118 can comprise a composite structure formed of quasi-isotropic face sheets sandwiching an aluminum honeycomb core having Invar fittings. However, other designs are contemplated herein.

A plurality of pins can be configured to extend outward from one or more of the sides (e.g., see the plurality of pins 130, 132, 134, 136, 138, 140), which can be configured to facilitate coupling of the individual struts of the various bipod strut pairs to the support base 118. The pins can be configured to engage and secure to respective sockets of the mounts of the individual struts of the bipod strut pairs. As will be discussed below in more detail when discussing cross-blade flexures, it is undesirable to subject the support structure 20 of the mirror 12 to bending or torsional forces as these dynamic forces provide additional force components which may result in additional mechanical print-through increasing the chance for mirror distortion. In the embodiment shown, the pins provide a connection between the support base 118 and each associated bipod strut pair. This pin connection allows each respective strut to float about the pin allowing for a strain fee condition of the bipod strut pairs during the assembly of the sub-tier mounting assembly 114a to mirror 20. This essentially eliminates bending forces that could be applied to a respective strut of an associated bipod pair as the support base 118 is repositioned. The result is that the pin transfers radial forces to a respective strut which translates to the strut being capable of applying linear tensile and compressive forces to be transferred to the nodes 32 of the support structure 20 of the mirror 12.

The support base 118 can further comprise a pair of angled mounting surfaces 142 and 144, which facilitate attachment of an adjustable strut pair 190 to the support base 118. Surfaces 142 and 144 provide a mounting plane perpendicular to the struts 194a and 194b line of action. This perpendicular orientation of the mating plane relative to the strut line of action eliminates the introduction of shear forces and mitigates the possibility of joint slippage, and inherently makes the joint more stable.

As indicated, the sub-tier mounting assembly 114a can further comprise, and can be coupled to the support structure 20 of the mirror 12 using an arrangement of a plurality of bipod strut pairs. Prior methods of attaching a mirror mount to a support structure of a mirror 12 often involved providing an anchor or a plug within the cavity of the node and attaching some sort of rigid rod to the anchor. However these anchor and plug arrangements provided unacceptable thermal and mechanical print-through.

As shown in this exemplary embodiment, the sub-tier mounting assembly 114a can comprise three bipod strut pairs, namely bipod strut pair 150a and 150b, (the third bipod strut pair being hidden from view) (collectively referred to as bipod strut pairs 150) spaced from one another about the support base 118 as if about three sides of a triangle to evenly disperse the loads exerted on the support structure 20 by the sub-tier mounting assembly 114a. The bipod strut pairs 150 can be supported about the support base 118, and the support base 118 configured, such that when in position, the bipod strut pairs 150 do not interfere with the ribs 24 of the support structure 20 of the mirror 20. For example, as shown, the support base 118 comprises a six-sided configuration, with each of the bipod strut pairs 150a, 150b, and the third pair (not shown) supported about every other side of the support base 118. In this configuration, the support base 118 can be positioned about the support structure 20 of the mirror 12 such that the sides of the support base 118 in support of the bipod strut pairs 150 are oriented transverse to at least some of the ribs 24, thus permitting each bipod strut in each of the bipod strut pairs 150 to extend down into the lattice support structure 20 between the ribs 24 and engage and secure to the node 32 without contacting and interfering with the ribs 24.

Figure 4B:
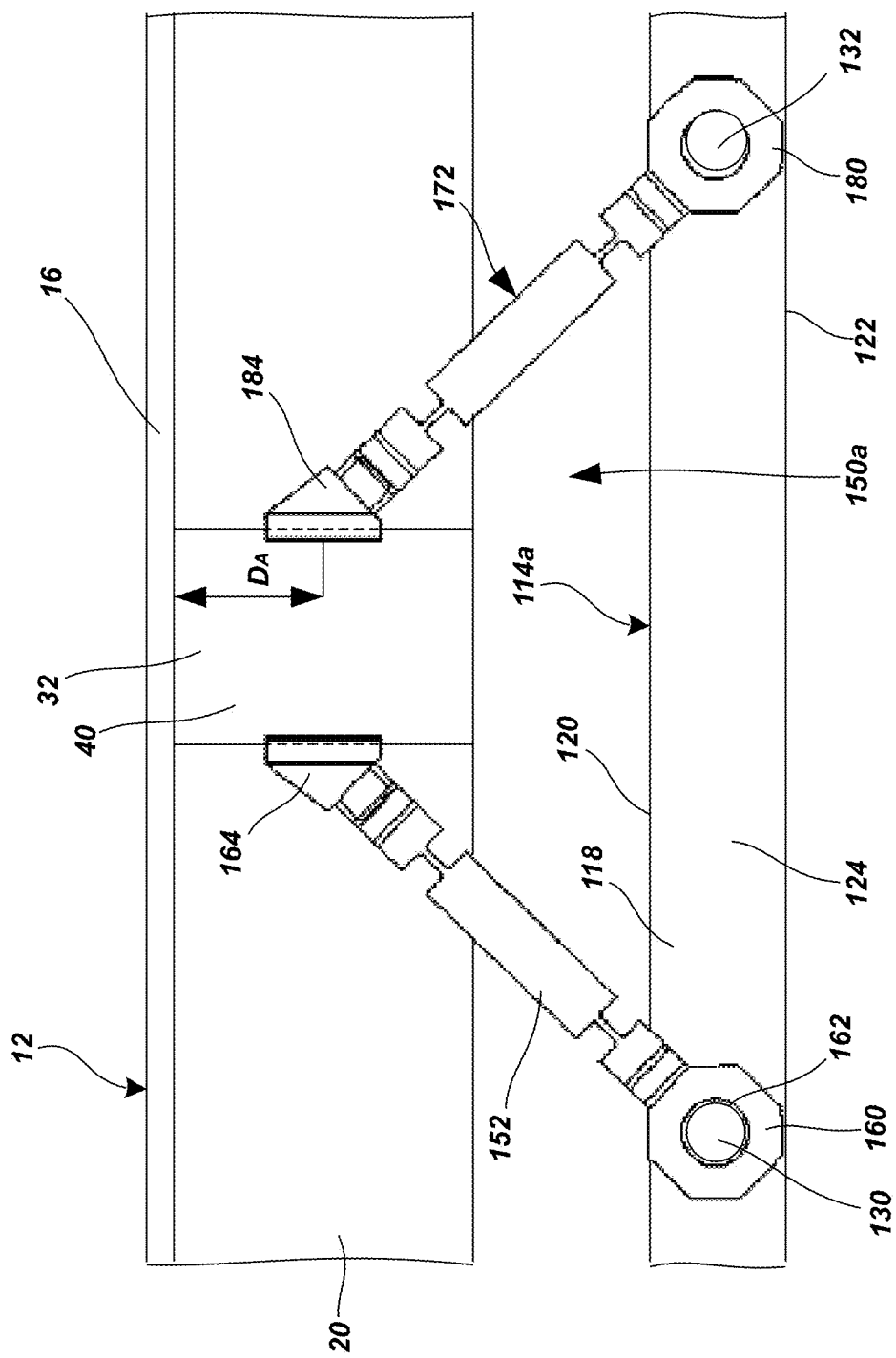
FIG. 4B illustrates a detailed partial cross-sectional side view of the mirror assembly of FIG. 2.
Figure 5:
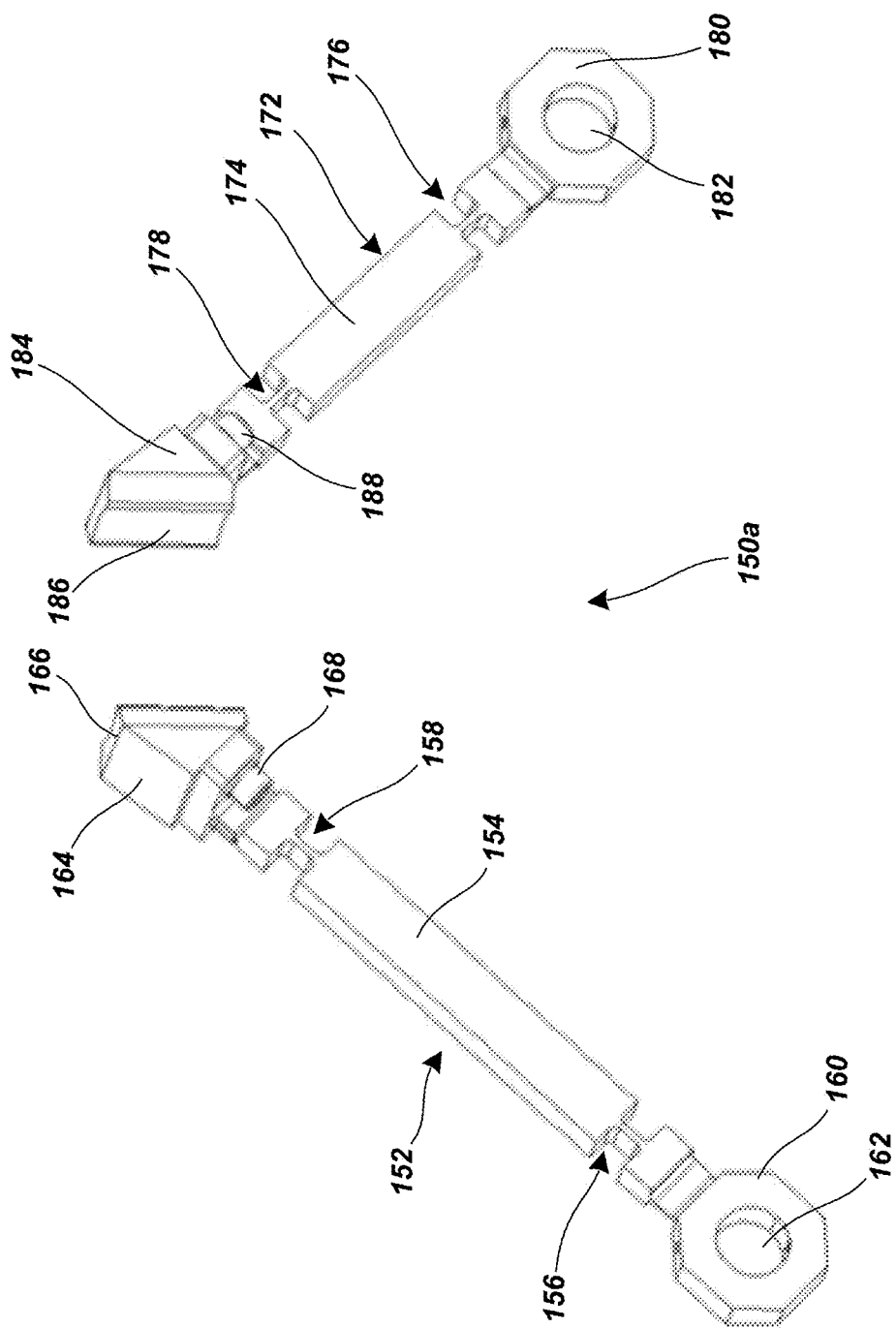
FIG. 5 is an isometric view of one of the bipod strut pairs of the sub-tier mounting assembly of FIG. 3.

The bipod strut pairs 150 can each comprise a first strut and a second strut (e.g., see first strut 152 and second strut 172 of bipod strut pair 150a of FIG. 4B), each having a longitudinal axis. The first and second struts 152 and 172 can be secured to the support base 118 at one end, and caused to extend from the support base 118 on an incline relative to an upper or lower surface of the support base 118, such that the longitudinal axes of the two struts converge and intersect about distal ends of the first and second struts 152 and 172. The first and second struts 152 and 172 can each be secured to the support structure 20 of the mirror 12 at the distal (or opposite) end, thus securing the sub-tier mounting assembly 114a to the mirror 12.

More specifically, and with reference only to bipod strut pair 150a and first strut 152 and second strut 172, bipod strut pair 150a attaches to the outer surface 40 of the node 32, which outer surface 40 functions as a connection surface. In one exemplary embodiment, the bipod strut pair 150a can be bonded to the outer surface 40 of the node 32 using an adhesive. In one exemplary embodiment, the adhesive can comprise an epoxy. Further, bipod strut pair 150a can be positioned and aligned so as to attach to opposing sides of the connection surface 40. In this arrangement, the horizontal force components between the two connections can be canceled, thus minimizing or eliminating bending forces applied to the node 32 that would otherwise possibly be transferred to the reflective surface of the mirror 12.

It will be recognized by those skilled in the art that the configurations and features described in relation to bipod strut pair 150a are similarly applicable to all other bipod strut pairs.

Bipod strut pair 150a can comprise a first strut 152 and a second strut 172 oriented with respect to one another as shown. The first strut 152 can comprise an elongate strut body 154 having first and second ends (or proximate and distal ends, the proximate end being the end closest to the support base 118, the distal end being closest to the mirror 12). In one exemplary embodiment, the elongate strut body 154 can be formed with cross blade flexures, such as cross blade flexures 156 and 158 located about its ends. Each cross blade flexure 156 and 158 can comprise two cross blades oriented ninety degrees relative to one another, although this particular configuration is not intended to be limiting in any way. Cross blade flexures 156 and 158 can provide good flexure efficiencies, meaning that they can provide good compressive and tensile strengths in the axial direction while allowing little to no torsional and bending stresses to be applied about the ends of the first strut 152. Having a cross-blade flexure in the strut is advantageous because it effectively eliminates bending and torsional loads applied about the end of the strut. In the case of the present invention, this minimizes any torque and bending applied to the node 32 when the support base 118 thermally expands or contracts when the system is exposed to changing thermal environments. Eliminating bending and torsional stresses applied to the node 32 reduces the number of factors that may result in thermal print-through. Meanwhile, if the cross-blade flexures apply only tensile or compressive loads acting along the longitudinal axis of the cross-blade flexure, the horizontal components of the force vector can essentially be neutralized or canceled out by placing another strut having another cross-blade flexure on the opposing side of the node 32. In other words, minimizing or substantially preventing torsional and bending stresses about the ends of the first strut 152 means that all forces acting along the rod are either compressive or tensile forces, which reduces the types of stresses applied to the support structure 20 of the mirror 112 about the outer connection surface 40 of the node 32, thus minimizing the amount of distortion applied to the mirror 12. Providing bipod strut pairs having cross-blade flexures can enhance the performance of the kinematic mirror mount by isolating the forces transferred to the mirror during thermal loading. While cross-blade flexures have shown to possess particularly advantageous qualities, struts having these should not be considered limiting in any way as other strut configurations are contemplated that can be used to provide the same or similar performance characteristics, including, but not limited to, necked rods, rods having ball jointed ends, hinges, or various rod-like devices.

The first strut 152, and particularly the elongate strut body 154, can be formed of any suitable material, such as metals, metal alloys. In one exemplary embodiment, the elongate strut body 154 can be formed of titanium.

The first strut 152 can further comprise a base mount 160 about the proximate end of the elongate strut body 154, the base mount 160 further comprising a socket 162. The first strut 152 can be coupled or otherwise secured to the support base 118 by causing the pin 130 to be received within the socket 162 of the base mount 160. The size of the pin 130 and the size of the socket 162 may differ, such that a gap is provided between the base mount 160 and the pin 130. For example, the gap may comprise a nominal gap of 0.05 inches. The gap can be bridged using a liquid shim potting material (e.g., an epoxy-based material with high compressive strength properties), or in other words, the connection or coupling between the pin 130 and the socket 162 of the base mount 160 can be filled with an adhesive which, once cured, allows for a strain free assembly of the strut 152, yet once the bond completely cures, allows for a structurally sound load path between the pin and the socket. This typed of joint allows for a strain free condition of the first strut 152 that cannot be achieved by other traditional joints such as bolted joints. This assembly is advantageous because if the assembly of the strut 152 to the support base 118 results in a strained condition, the strut will nominally have deflection in the cross bladed flexures, thus making them less efficient and in some cases even cause a transfer of bending loads to the mirror, resulting in an increase in mirror distortion.

The first strut 152 can further comprise a mount pad 164 supported about the distal end of the elongate strut body 154, and configured to be secured to the support structure 20 of the mirror 12, thus securing the sub-tier mounting assembly 114a to the mirror 12. In one embodiment, the mount pad 164 can be secured to the support structure 20 of the mirror 12 using an adhesive or bonding agent, in which the mount pad 164 is bonded to the support structure 20. The adhesives or bonding agents can comprise high strength epoxy adhesives that are relatively soft and have relatively close CTE matches to the mirror material. Specific adhesives can include Hysol EA9394, Hysol EA9309, or 3M EC 2216 or others.

The mount pad 164 can comprise a mounting surface 166 configured to conform to or mate with the outer surface 40 of the node 32. In the exemplary embodiment shown, the mounting surface 166 comprises a cylindrical configuration that coincides with and conforms to the cylindrical outer surface 40 of the node 32 to which the mount pad 164 is bonded. This allows for consistent and stronger bonding of the mount pad 164 to the outer surface 40 of the node 32. In addition to coinciding in shape, the mount pad 164 can be angled so as to allow a linear attachment of the first strut 152. Further, the mount pad 164 can be secured in locations at a particular distance from the mirror surface 16 which are analytically computed to provide an optimal neutral axis height so as to provide the least amount of thermally induced strain and thereby distortion to the mirror surface. Further, the mount pad 164 can be designed and oriented and shaped so as to direct the load path along the axis of the first strut 152 and through the centroid of the mount pad 164 or the center of the bond area generated between the mount pad 164 and the outer surface 40 of the node 32. By directing the load path in this manner, an efficient bond joint can be formed which can function to reduce the strength requirements of the joint, thus allowing the bond area to be minimized and the bond efficiency to be improved.

Reducing the bond area, provides numerous advantages, one of which, as discussed above, provides smaller bonding areas that permit more slender and less robust mounting areas (e.g., for reducing weight). However, the primary advantage arises in that this minimizes the area subjected to thermal print-through mirror distortion.

The mount pad 164 can be formed of a variety of materials. However, it is of a particular advantage to form the mount pad 164 out of a material having a coefficient of thermal expansion being matched as near as possible to that of the material making up mirror 12, and particularly the structural support 20 of the mirror 12. In one exemplary embodiment, the mount pad 164 can be formed of an iron-nickel alloy commonly known as Invar-39 or Carpenter Alloy 39, which matches to a certain extent the coefficient of thermal expansion of silicon carbide, one of the materials out of which the mirror 12 can be formed. The selection of a material for the mount pad 164 that matches (to the extent possible) the thermal expansion properties of the mirror can be advantageous, particularly in applications where the mirror may undergo large temperature differentials or large bulk temperature changes (e.g., as may be experienced in space), as distortion over a large temperature change may cause unwanted distortion of the mirror surface.

The mount pad 164 and the cross-blade flexures of the individual struts of the bipod strut pair allows for thermal expansion and shrinking of the support base 118 without transferring the thermal expansion forces associated with the support base 118 (this being formed of a different material) and the bipod strut pair to the mirror. Utilizing bipod pairs to attach the support base 118 to the mirror 12 functions to thermally isolate the two structures, which in turn functions to reduce the thermal print-through to the mirror surface. The analytical computation of the neutral axis height for purposes of placing the mount pad 164 as discussed above may also take into account thermal print-through when determining the optimal placement location of the mount pad 164.

The mount pad 164 can be coupled to the elongate strut body 154 using fasteners or fastening means, such as bolts, screws, adhesives, etc. In the embodiment shown, the mount pad 164 is coupled to the elongate strut body 154 using bolts 168.

It is noted that the second strut 172 can comprise the same or similar features as the first strut 152, and can provide the same or similar functionality. Indeed, the second strut 172 can comprise an elongate strut body 174 having cross blade flexures 176 and 178 about proximate and distal ends, respectively. A base mount 180 with a socket 182 can be formed or otherwise located about the proximate end of the elongate strut body 174. A mount pad 184 with a mounting surface 186 can be coupled or otherwise located about the distal end of the elongate strut body 174 (e.g., coupled thereto using bolts 188).

As indicated above, the bipod strut pair 150a can be mounted or otherwise coupled to the support structure 20 of the mirror 12, such that first and second struts 152 and 172 are mounted opposite one another about the node 32. Furthermore, it is recognized that an attachment depth $D_A$ of the mount pads 164 and 184, respectively, can result in different performance properties provided by the sub-tier mounting assemblies 114a-c. In one aspect, the attachment depth $D_A$ can have an effect on the degree of distortion in the reflective surface of the mirror 12. It is noted that the attachment depth $D_A$ can be referred to as the distance of a center point on the mounting surfaces 166 and 186 of the mount pads 164 and 184, respectively, from the underside of the reflective surface of the mirror. It is further noted that the sub-tier mounting assemblies 114a-c provide a reduction in mirror surface distortion over prior related mounting solutions regardless of the attachment depth $D_A$.

Performance of the sub-tier mounting assemblies 114a-c in reducing mirror surface distortion can be improved when the mount pads 164 and 184 of the bipod strut pair 150a are placed at an optimal neutral axis height having attachment depth $D_A$ ranging from directly abutting the underside or rear side of the reflective surface 16 to some distance away from the underside of the reflective surface. In the embodiment shown, improved performance may be achieved with the attachment depth $D_A$ being between 0 and 1.0 inches from the underside of the reflective surface 16, with optimal performance occurring with the attachment depth $D_A$ at or approximately 0.6 inches. As those skilled in the art will recognize, this is not intended to be limiting in any way, and other attachment depth distances may be determined to be optimal for a different mirror assembly depending upon the specific geometry of the mirror, the mirror mounting features, and the mounting hardware.

During installation, it may be advantageous to properly position and align the mount pads in the various bipod strut pairs relative to one another and the support structure, and to maintain this during curing of the adhesive or bonding agent used to secure the mount pads to the support structure of the mirror. Moreover, it may be advantageous to do this using a zero gravity arrangement where all of the components being assembled can be held in place so as to effectively cause them to float while the adhesive or bonding agent cures. In this arrangement, the components can be held in a manner so that there is little or no load or strain on them.

In doing this, stresses between the components, particularly stresses between the bipod strut pairs and the support structure of the mirror, are reduced or eliminated, with the adhesive or bonding agent caused to cure in this arrangement. Installation or assembly with as little stress as possible can be desirable so as to reduce or eliminate the stress, to the extent possible, applied to the mirror itself. This arrangement can be achieved, for example, using an assembly jig.

Some prior mirror mounting assemblies comprise an insert or plug designed to fit into the interior volume or space of a hollow geometric node of a mirror support structure (such as the node 32 of the mirror 12 discussed above). These mounting assemblies, regardless of material, tend to permit relatively large distortions of the mirror surface as they are unable to cancel out bending or torsional forces. For example, it is not uncommon for mounting assemblies of this type to result in the mirror assembly having a wave front error (WFE) of 0.043 waves (at a wavelength of 0.6328 microns) root mean squared (RMS) under a bulk temperature change of −30 degrees Celsius.

On the other hand, the mirror assembly utilizing the kinematic mirror mount of the present invention can achieve a WFE between 0.0041 and 0.0085 waves (at a wavelength of 0.6328 microns) RMS under a bulk temperature change of −30 degrees Celsius (this with the mount pads being located at an attachment depth $D_A$ of approximately 0.6 inches). Compared with a prior mirror mount using plugs or inserts, the kinematic mirror mount discussed herein can be configured to provide between 75% and 90% less distortion of the mirror surface depending upon various factors, such as the attachment depth $D_A$.

Although not specifically discussed herein, each of the remaining bipod strut pairs supported about the support base 118 can be configured to secure to the mirror 12 and perform in a similar manner as bipod strut pair 150a. Accordingly, each bipod strut pair in a sub-tier mounting assembly can be similarly configured and aligned to support the support base 118 and the mirror 12 in proper alignment, and to further equalize forces applied to the mirror 12 so as to minimize distortion of the mirror surface.

With reference to FIGS. 3-4B and 7A-7B, the sub-tier mount assembly 114a can further comprise a pair of adjustable struts (e.g., see adjustable strut pair 190). The adjustable strut pair 190 can comprise a first adjustable strut 194a and a second adjustable strut 194b. The adjustable strut pair 190 can function to attach the sub-tier mount assembly 114a and the mirror 12 to a metering structure, optical bench, or another typical mirror support structure (not shown). In one aspect, the adjustable strut pair 190 can facilitate repositioning and refocusing of the mirror 12.

The adjustable strut pair 190 facilitates movement and repositioning of the support base 118 relative to the mirror 12. The adjustable struts 194a and 194b can be attached to the angled mounting surfaces 142 and 144 located on the support base 118118. The adjustable struts 194a and 194b can comprise flexure type rods to reduce torsional and bending stresses. In some mirror assembly embodiments, the geometry of the mirror, and the locations of the kinematic mirror mount and the sub-tier mounting assemblies in support of the mirror, can cause forces acting on the mirror to be unequally balanced, particularly at the various bipod pairs. For example, some embodiments may exhibit higher concentrations of stress at the bipod pairs located closest to the center of the mirror 12.

The connection locations of the adjustable strut pair 190 about the support base 118 can be transposed out radially a certain distance in relation to the center of the support base 118 wherein their selective adjustment functions to equalize the forces exerted on each bipod strut pair of the sub-tier mounting assembly 114a.

Indeed, in order to balance forces at each of the various bipod strut pairs, the adjustable struts attached to the support base 118 can be translated radially outward to a location that facilitates equalization of the forces between the bipod strut pairs. In one exemplary embodiment, the adjustable struts 194a and 194b can be translated out any needed or desired distance. The adjustable struts 194a and 194b can further be coupled or otherwise secured at opposing ends to the AMS, telescope frame, or mirror housing (not shown).

Figure 8:
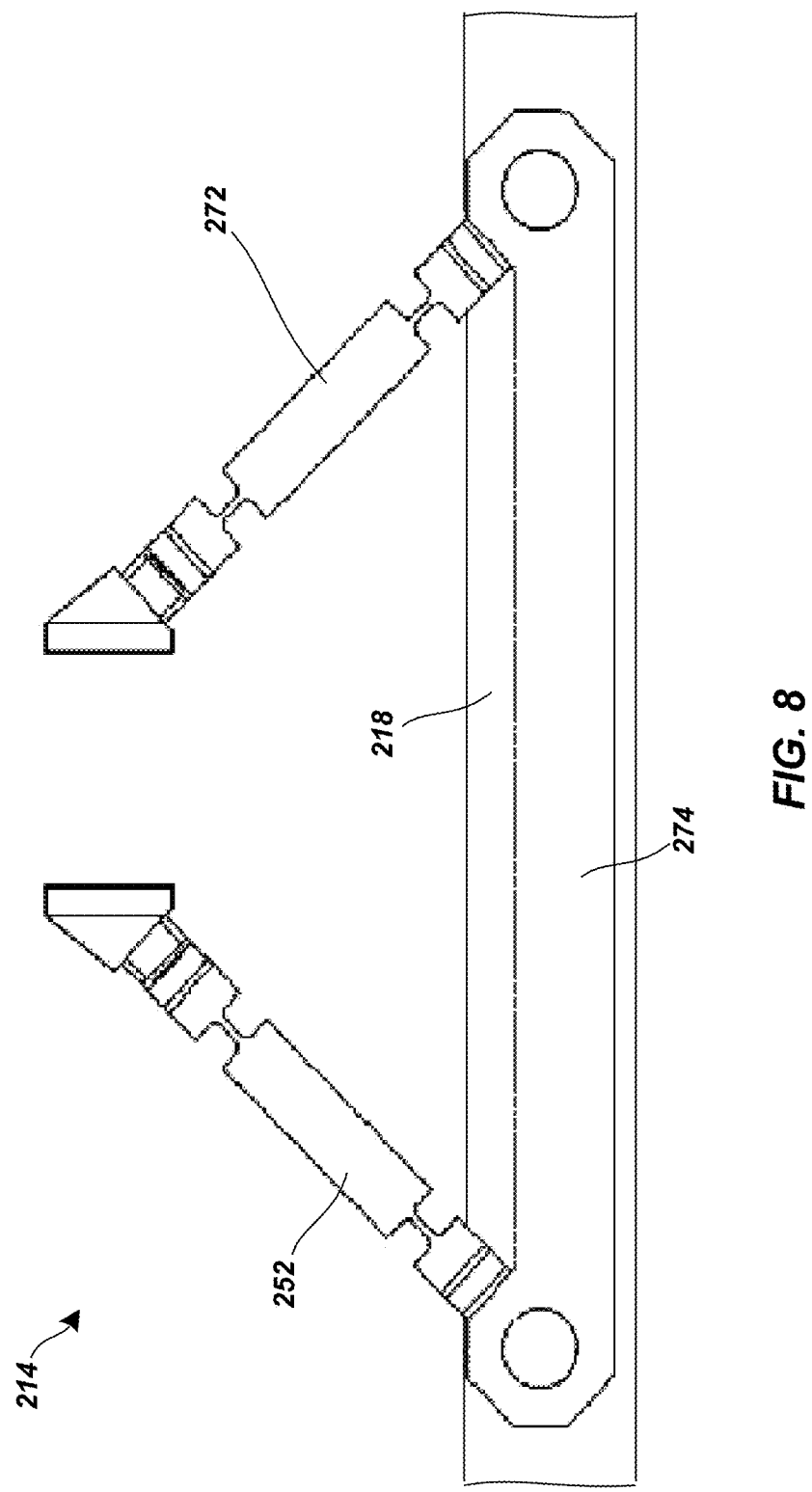
FIG. 8 illustrates a side view of a sub-tier mounting assembly, and particularly a bipod strut pair thereof, formed in accordance with another exemplary embodiment of the present invention.

With reference to FIG. 8, illustrated is a sub-tier mount assembly 214, formed in accordance with another exemplary embodiment of the present invention. The sub-tier mount assembly 214 is similar in many respects to the sub-tier mount assembly 114a discussed above. However, as shown in this particular embodiment, the sub-tier mount assembly 214 can comprise a plurality of bipod strut pairs (see bipod strut pair 250 (the others being hidden from view)) having individual bipod struts (see strut 252 and strut 272) coupled together with a bridge member 274. The bridge member 274 can be configured to interface with and couple to the sub-tier mounting assembly 218, thereby also coupling the individual struts 252 and 272 to the sub-tier mounting assembly 218. The bridge member 274 can function to transfer forces directly between and as applied to the individual struts 252 and 272. Although not specifically described, the bipod strut pair 250 can function similarly as the other bipod strut embodiments discussed herein.

Figure 9A:
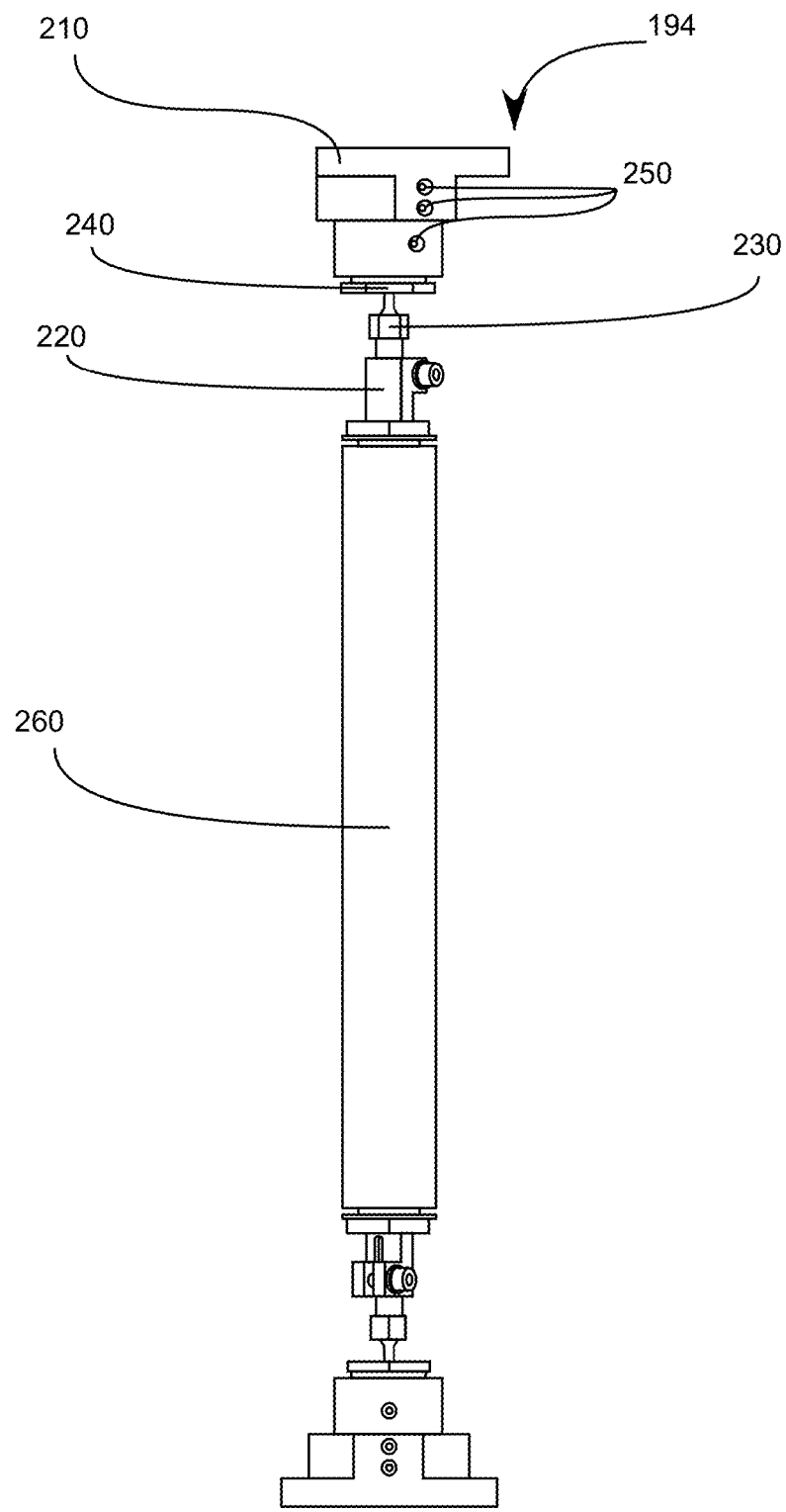
FIGS. 9A-C depicts various views of the adjustable struts and its components.
Figures 9B, 9C:
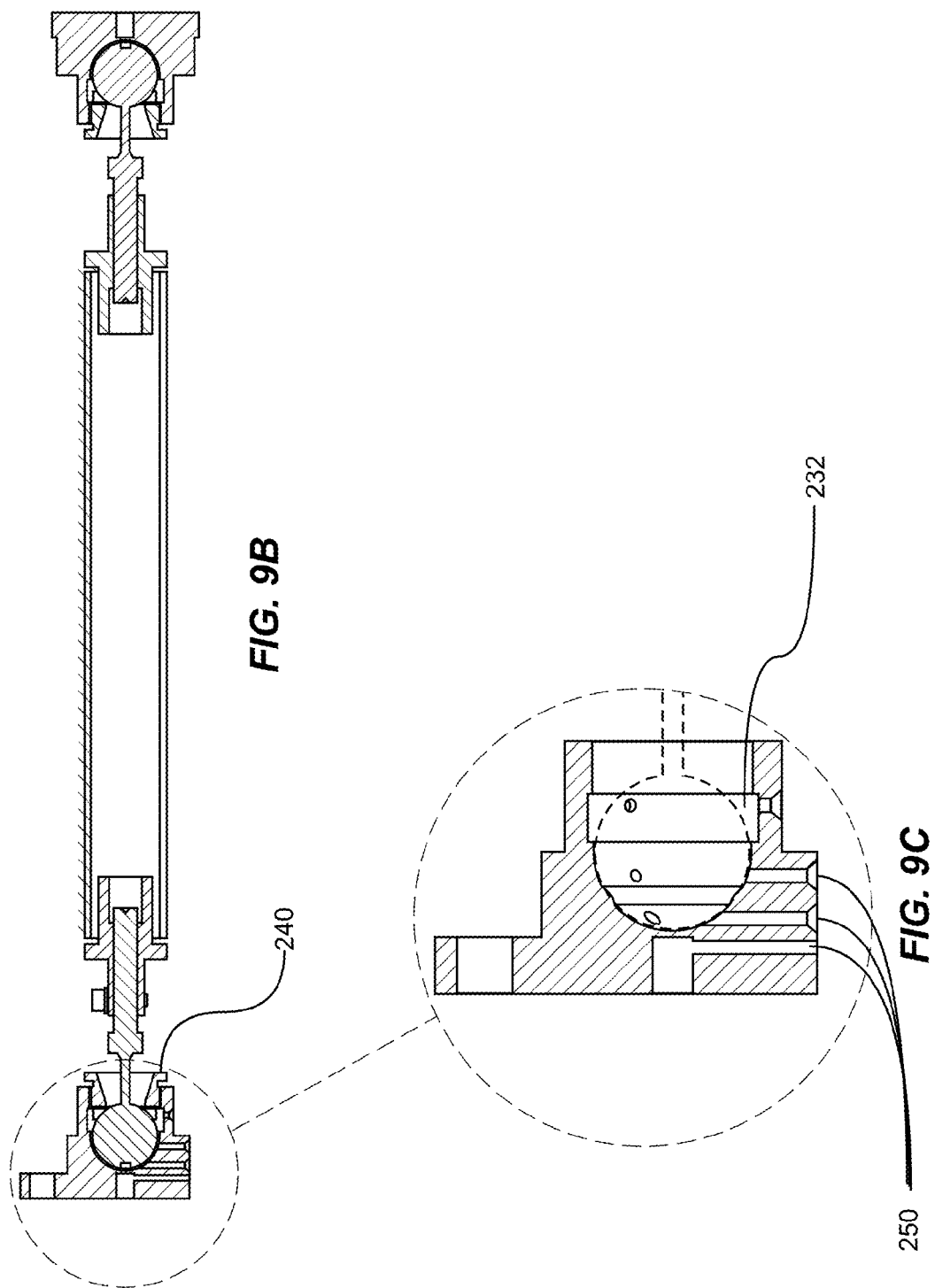

With reference to FIGS. 9A-C, shown is an exemplary embodiment of an adjustable strut 194 in accordance with one aspect of the present invention. Any discussion with regard to features and attributes of adjustable strut 194 may be similarly applied to all of the various adjustable struts of the optimal kinematic mirror mount in any number of combinations. Additionally, in some embodiments strut 194 can comprise two similarly configured ends, wherein the discussion pertaining to a first end may be similarly applicable to the second end.

The adjustable strut 194 can provide structural support with mounting interfaces that allow for the capability of providing kinematic isolation and proper alignment. An end of the adjustable strut 194 may comprise a housing 210 provided with attachment means for attaching or otherwise coupling one end of the adjustable strut 194 to the support base (not shown) and the other end of the adjustable strut 194 to the mirror support structure (not shown).

The housing 210 can be configured to receive the end of an adjustable post 230. The adjustable post 230 is shown having a configuration with a spherical ball end, a flexure rod and a threaded post section having fine threads for high resolution adjustment of the post. The threaded post section of the adjustable post 230 can be coupled to a strut main body 260 by means of a strut fitting 220 having a threaded interior which is mated or coupled to the strut main body 260. Meanwhile, the spherical ball end of the adjustable post can be mated into a conical interior surface of housing 210 and held into a desirable position via a conical washer 232 and clamp nut 240. This resulting ball joint allows the strut ends to freely rotate inside their respective housings while each of the different struts associated with the support base are being adjusted. As the struts are individually adjusted, small angle misalignments are induced in the struts. This ball joint prohibits the angle misalignments from inducing moments in the struts that could transmit down into the mirror and manifest as increased wave front error.

Additionally, the adjustable post 240 can comprise a necked down thin section that acts as a flexure. When the primary mirror assembly is subject to different thermal environments, material mismatches between the support base and the structure to which the primary mirror assembly is mounted to can cause strain in the adjustable struts. The strain from these thermal material mismatches can transmit down into the mirror and manifest as increased wave front error. The necked down flexures in the adjustable post 230 can act to absorb the strain and increase the kinematic isolation of the primary mirror assembly, thus mitigating this risk of thermal distortion and unacceptable wave front error.

The spherical ball end of the adjustable post 230 and the conical interior of the housing 210 form a ball joint, wherein the ball joint can be locked down by a variety of methods. In one exemplary embodiment, the clamp nut 240 can be torqued down. However, for a primary mirror with tight wave front error tolerances, such as with the application of the present invention, residual moments in the ball joint caused by torquing down the clamp nut 240 can cause excessive distortion in the mirror. Therefore, in an alternative exemplary embodiment, the housing 210 can be equipped with bond injection holes 250 and small gaps between the ball end of the adjustable post 230 and the housing 210. This allows room to bond the ball joint instead of clamping it down. The bonding process allows for the ability to create the necessary joint stiffness in the fittings without introducing any residual moments. In this second method the clamp nut 240 can be used to retain the bond rather than being relied upon to retain position.

Additionally the resolution of adjustability of the strut 194 can be enhanced by the threaded section of the adjustable post 230. The adjustable post 230 can comprise a fine threaded shaft that can rotate in and out of the strut fitting 220 which can be coupled into the strut main body 260. This provides high resolution control of the length of the strut 194. The strut fitting 220 can be equipped with a split clamp which locks the adjustable post 230 in place when a desired strut length is achieved. As a system, the adjustable struts associated with a support base provide translational and rotational adjustability to the primary mirror assembly and facilitate alignment of the primary mirror.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An adjustable mirror assembly comprising:
   a mirror having a reflective surface and a support structure; and
   a kinematic mirror mount operable to support the mirror, the kinematic mirror mount comprising a plurality of sub-tier mounting assemblies spaced from one another about the support structure of the mirror to distribute the support forces about the mirror, the sub-tier mounting assemblies each comprising:
   an individual support base;
   a plurality of bipod strut pairs coupled to the support base, each bipod strut pair comprising individual first and second struts;
   adjustable struts coupled to the individual support base about a side opposite a side about which the plurality of bipod strut pairs are coupled, the adjustable struts being adjustable to equalize the load between each bipod strut pair; and
   a mount pad supported about each of the first and second struts, the mount pads being secured to the support structure of the mirror.

2. The mirror assembly of claim 1, wherein the support structure of the mirror further comprises:
   a latticework of support ribs of unitary formation having a plurality of nodes, the latticework having a plurality of mounting surfaces.

3. The mirror assembly of claim 2, wherein the nodes comprise hollow geometric shapes having inner and outer surfaces, wherein the outer surfaces function as an attachment surface for the mount pads.

4. The mirror assembly of claim 3, wherein the mount pads comprise a surface configuration that coincides with a corresponding surface configuration of the outer attachment surface of the node.

5. The mirror assembly of claim 1, wherein the adjustable struts are coupled between the support base and an adjustable mirror structure.

6. The mirror assembly of claim 1, wherein the mirror assembly facilitates a thermal distortion wave front error of the mirror between 0.004 and 0.009 waves root mean squared at a wavelength of 0.6328 microns, over a bulk temperature change of −30° C.

7. The mirror assembly of claim 1, wherein the support structure comprises a quasi-isotropic face sheets sandwiching an aluminum honeycomb core.

8. The mirror assembly of claim 1, wherein the plurality of bipod strut pairs comprise strut configurations selected from the group consisting of cross-blade flexures, necked rods, and rods having ball joints affixed to an end.

9. The mirror assembly of claim 1, wherein the plurality of bipod strut pairs comprise struts having cross-blade flexures.

10. The mirror assembly of claim 1, wherein the mount pads are coupled to the bipod struts such that the load path is directed through a centroid of a bonding area between the mount pads and the support structure of the mirror.

11. The mirror assembly of claim 1, wherein the mirror comprises a silicon carbide mirror.

12. The mirror assembly of claim 1, wherein the mount pads comprise a low-expansion Iron-Nickel alloy.

13. The mirror assembly of claim 1, wherein the plurality of bipod strut pairs are coupled to the support base using a liquid shim potting material.

14. The mirror assembly of claim 1, wherein the mount pads are secured to the support structure of the mirror at an optimal neutral axis height as analytically computed for the mirror.

15. A method for supporting a mirror comprising:
obtaining a mirror having a reflective surface and a support structure in support of the reflective surface; and
securing the mirror to a kinematic mirror mount having a plurality of sub-tier mounting assemblies operable to support the mirror, the sub-tier mounting assemblies each comprising:
an individual support base;
a plurality of bipod strut pairs coupled to the support base, each bipod strut pair comprising individual first and second struts;
adjustable struts coupled to the individual support base about a side opposite a side about which the plurality of bipod strut pairs are coupled, the adjustable struts being adjustable to equalize the load between each bipod strut pair; and
a mount pad supported about each of the first and second struts, the mount pads being secured to the support structure of the mirror.

16. The method of claim 15, wherein the mount pads further comprise a surface having a configuration that coincides with a corresponding configuration of an attachment surface of the support structure of the mirror.

17. The method of claim 15, further comprising aligning the plurality of mount pads relative to one another.

18. The method of claim 15, wherein the kinematic mirror mount facilitates a thermal print-through distortion wave front error between 0.009 and 0.004 waves RMS.

19. The method of claim 15, wherein the mirror comprises a silicon carbide mirror.

20. The method of claim 15, wherein the mount pads are formed of a low-expansion Iron-Nickel alloy.

21. A kinematic mirror mount operable to support a mirror, comprising:
a plurality of sub-tier mounting assemblies coupleable to a support structure of a mirror to distribute the support forces about the mirror, the sub-tier mounting assemblies each comprising:
an individual support base spaced apart from the individual support bases of the other sub-tier mounting assemblies;
a plurality of bipod strut pairs coupled to the support base, each bipod strut pair comprising individual first and second struts;
adjustable struts coupled to the individual support base about a side opposite a side about which the plurality of bipod strut pairs are coupled, the adjustable struts being adjustable to equalize the load between each bipod strut pair; and
a mount pad supported about each of the first and second struts, the mount pads being securable to the support structure of the mirror.

22. The kinematic mirror mount of claim 21, further comprising adjustable struts coupled to the support base of each sub-tier mounting assembly and coupleable to an adjustable mirror structure, the adjustable struts being coupled to the support base so as to equalize the load between each bipod strut pair.

23. The kinematic mirror mount of claim 21, wherein the plurality of bipod strut pairs comprise strut configurations selected from the group consisting of cross-blade flexures, necked rods, and rods having ball joints affixed to an end.

24. The kinematic mirror mount of claim 21, wherein the mount pads are coupled to the bipod struts such that the load path is directed through a centroid of a bonding area between the mount pads and the support structure of the mirror.

25. A sub-tier mounting assembly of a kinematic mirror mount operable to support a mirror, the sub-tier mounting assembly comprising:
a support base;
a plurality of bipod strut pairs coupled to the support base, each bipod strut pair comprising individual first and second struts;
a mount pad supported about each of the first and second struts, the mount pads being securable to the support structure of the mirror; and
adjustable struts coupled to the support base about a side opposite a side about which the plurality of bipod strut pairs are coupled, the adjustable struts being adjustable to equalize the load between each bipod strut pair,
wherein the sub-tier mounting assembly is operable to be coupled to a support structure of a mirror with at least one additional sub-tier mounting assembly to distribute the support forces about the mirror, and wherein the individual support bases of each of the sub-tier mounting assemblies are configured to support the mirror in spaced apart positions from one another.

* * * * *